United States Patent
Wu

(10) Patent No.: US 7,140,226 B2
(45) Date of Patent: Nov. 28, 2006

(54) METHODS FOR MAKING A BICYCLE FRAME PART HAVING A DISPROPORTIONALLY ENLARGED END SECTION

(75) Inventor: K. U. Wu, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 245 days.

(21) Appl. No.: 10/756,367

(22) Filed: Jan. 14, 2004

(65) Prior Publication Data

US 2004/0144152 A1   Jul. 29, 2004

Related U.S. Application Data

(63) Continuation-in-part of application No. 10/211,550, filed on Aug. 5, 2002, now abandoned.

(51) Int. Cl.
*B21D 39/08* (2006.01)

(52) U.S. Cl. ............................... 72/370.06; 72/370.01; 72/370.14

(58) Field of Classification Search ............. 72/370.06, 72/370.03, 370.02, 370.15, 370.1, 306, 316, 72/370.14, 367.1, 370.01; 29/890.052, 890.053
See application file for complete search history.

(56) References Cited

U.S. PATENT DOCUMENTS

| | | | | |
|---|---|---|---|---|
| 2,739,376 A | * | 3/1956 | Peet | 72/342.1 |
| 4,301,672 A | * | 11/1981 | Simon | 72/370.03 |
| 5,671,626 A | * | 9/1997 | Lonbani | 72/42 |
| 5,832,766 A | * | 11/1998 | Hartman et al. | 72/62 |
| 6,453,714 B1 | | 9/2002 | Kido et al. | |
| 6,581,433 B1 | * | 6/2003 | Otsuka et al. | 72/370.06 |
| 6,826,943 B1 | * | 12/2004 | Rempe et al. | 72/370.06 |
| 6,845,552 B1 | * | 1/2005 | Blough | 29/421.1 |
| 2002/0043089 A1 | * | 4/2002 | Reiche et al. | 72/283 |

* cited by examiner

*Primary Examiner*—Derris H. Banks
*Assistant Examiner*—Teresa M. Bonk
(74) *Attorney, Agent, or Firm*—Finnegan, Henderson, Farabow, Garrett & Dunner LLP

(57) ABSTRACT

A bicycle frame part having a disproportionally enlarged end section and a method for making the same. The method may include disproportionally enlarging an end section of an aluminum alloy tube of a bicycle frame part includes the steps of (a) drawing the tube to form a thin section and a thick end section, (b) radially and proportionally enlarging the cross-section of the thick end section of the tube by forging the tube in such a manner that the wall thickness of the thick end section after being enlarged is substantially the same as that of the thin section, and (c) disproportionally varying the cross-section of the thick end section of the tube by forging the tube obtained in step (b).

18 Claims, 9 Drawing Sheets

METHODS FOR MAKING A BICYCLE FRAME PART HAVING A DISPROPORTIONALLY ENLARGED END SECTION

CROSS-REFERENCE TO RELATED APPLICATION

This application is a continuation-in-part (CIP) of U.S. patent application Ser. No. 10/211,550, now abandoned filed by the applicant on Aug. 5, 2002, the entire disclosure of which is incorporated herein by reference.

BACKGROUND OF THE INVENTION

1. Field of the Invention

This invention relates to a multi-stage tube forging method for disproportionally enlarging an end section of an aluminum alloy tube of a bicycle frame part.

2. Description of the Related Art

FIG. 1 illustrates a conventional method of forming a bicycle tube that includes the steps of cutting a hollow rigid tube 1 having a predetermined length, and placing the tube 1 thus cut in a tube forming machine. During the tube forming operation, the middle section of the tube 1 is clamped by a positioning clamp seat 11 of the tube forming machine, with a pair of mandrels 13 inserted respectively and movably into two opposite ends of the tube 1 and a pair of mold components 12 sleeved respectively and movably on the ends of the tube 1. The inner diameter and wall thickness of the tube 1 are changed along the length of the tube 1 as a result of the movement of the mold components 12 and the pair of mandrels 13.

U.S. Pat. No. 6,453,714 describes a method for forming an eccentrically expanded pipe that includes the steps of coaxially expanding a portion of a base pipe 2 at least one time by using a first expander punch (not shown) to form an expanded portion 21, an intermediate tapering portion 22 and a neck portion 23, and as shown in FIG. 2, decentering the expanded portion 21 and the neck portion 23 relative to one another by using a second expander punch 24 having a diameter larger than that of the first expander punch.

The abovementioned conventional methods are disadvantageous in that the body of either the tube 1 or the base pipe 2 is subjected to a relatively large internal stress therein. In addition, if the tube 1 or the base pipe 2 is made from aluminum alloy, the same tends to break during the enlarging operation.

SUMMARY OF THE INVENTION

Therefore, the object of the present invention is to provide a multi-stage tube forging method for disproportionally enlarging an end section of an aluminum alloy tube that is capable of overcoming the aforesaid problems associated with the prior art.

According to the present invention, the multi-stage tube forging method for disproportionally enlarging an end section of an aluminum alloy tube comprises the steps of: (a) drawing the aluminum alloy tube to form a thin section and a thick end section extending from the thin section, wherein the thin section has a wall thickness thinner than that of the thick end section; (b) radially and proportionally enlarging the cross-section of the thick end section of the aluminum alloy tube by forging the aluminum alloy tube in a first die using a first mandrel in such a manner that the wall thickness of the thick end section after being enlarged is substantially the same as that of the thin section; and (c) disproportionally varying the cross-section of the thick end section of the aluminum alloy tube by forging the aluminum alloy tube in a second die using a second mandrel.

Preferably, the perimeter of an end edge of the thick end section of the aluminum alloy tube obtained after step (c) is substantially equal to that of the end edge of the thick end section of the aluminum alloy tube obtained after step (b) and before step (c).

BRIEF DESCRIPTION OF THE DRAWINGS

In the drawings which illustrate an embodiment of the invention.

DETAILED DESCRIPTION OF THE PREFERRED EMBODIMENT

Figure 1:
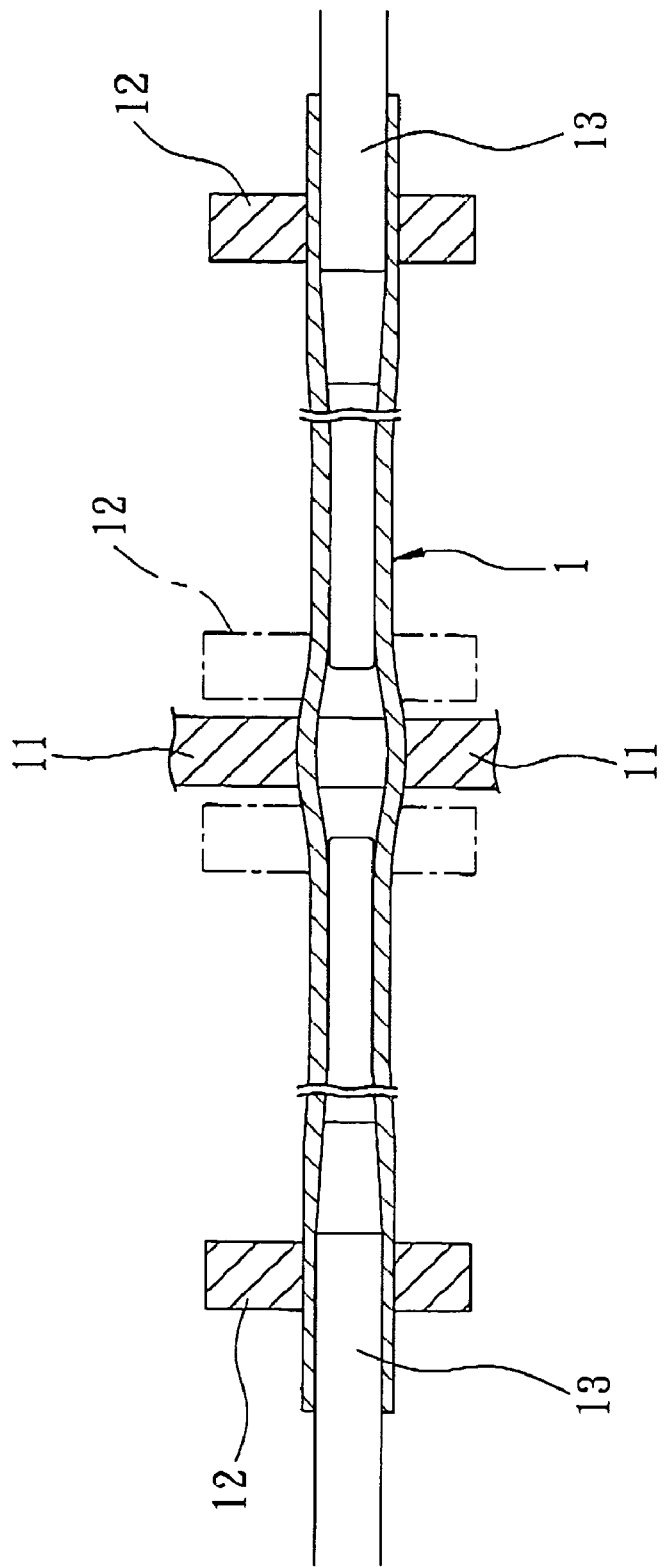
FIG. 1 illustrates a conventional method of forming a bicycle tube.
Figure 2:
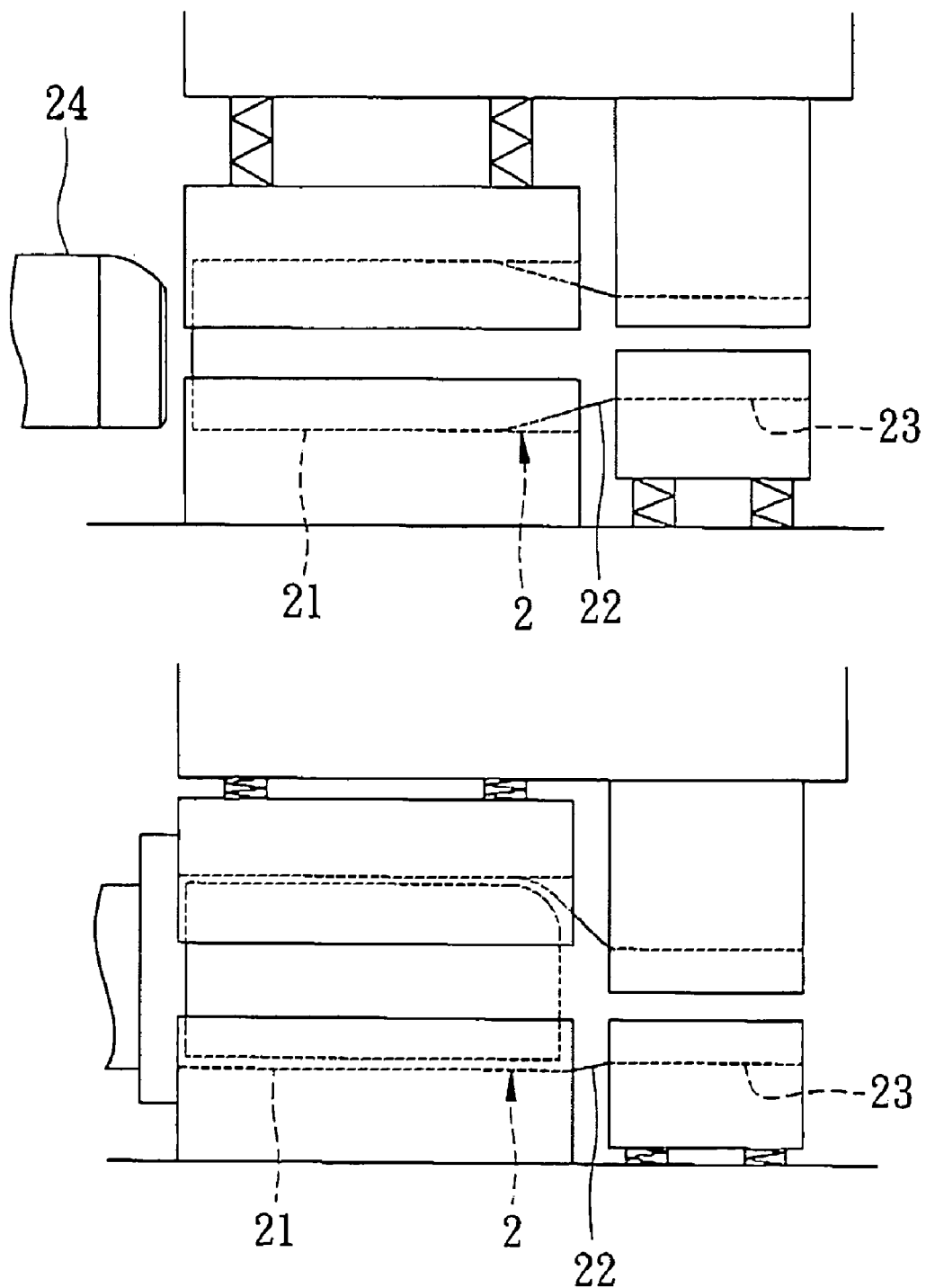
FIG. 2 illustrates an eccentrically expanding operation of a conventional method for forming an eccentrically expanded pipe.
Figure 3:
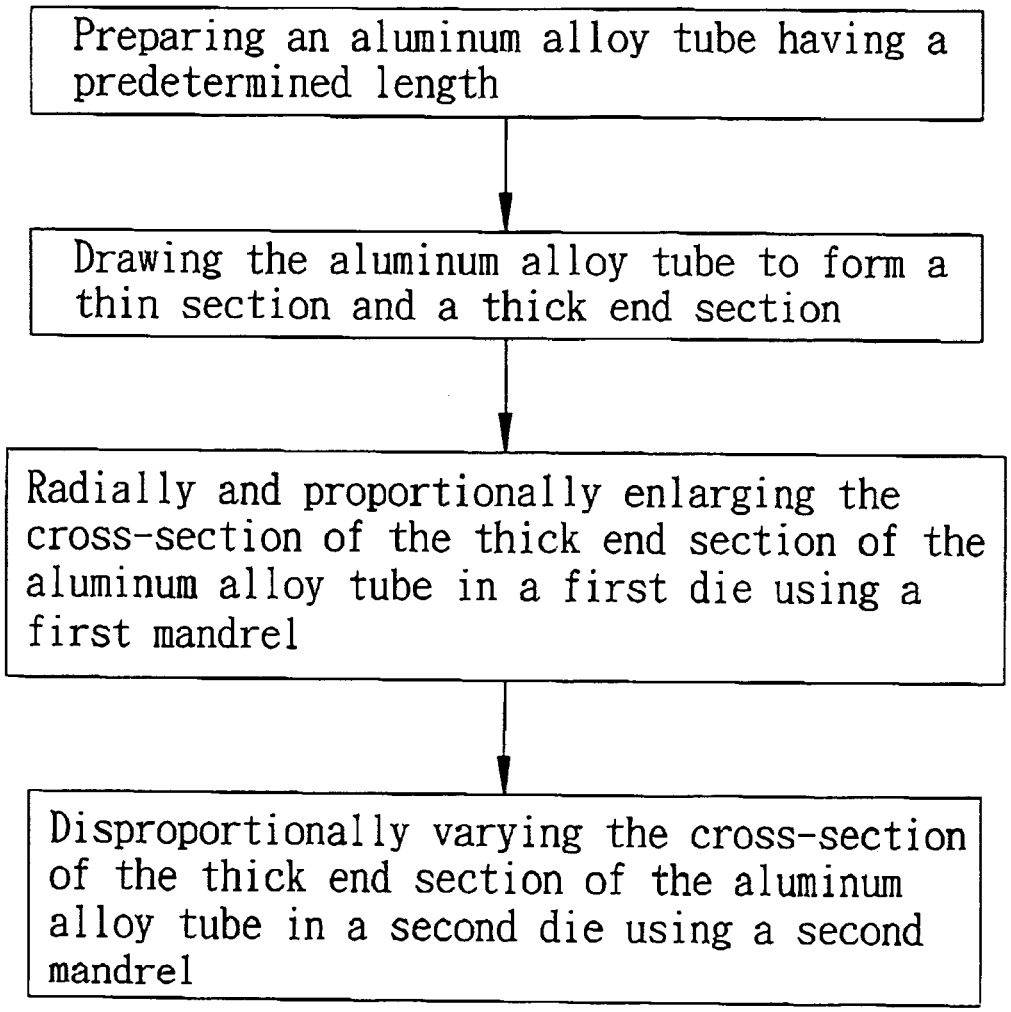
FIG. 3 is a block diagram illustrating consecutive steps of the preferred embodiment of a multi-stage forging method of this invention for disproportionally enlarging an end section of an aluminum alloy tube of a bicycle frame part.
Figure 4:
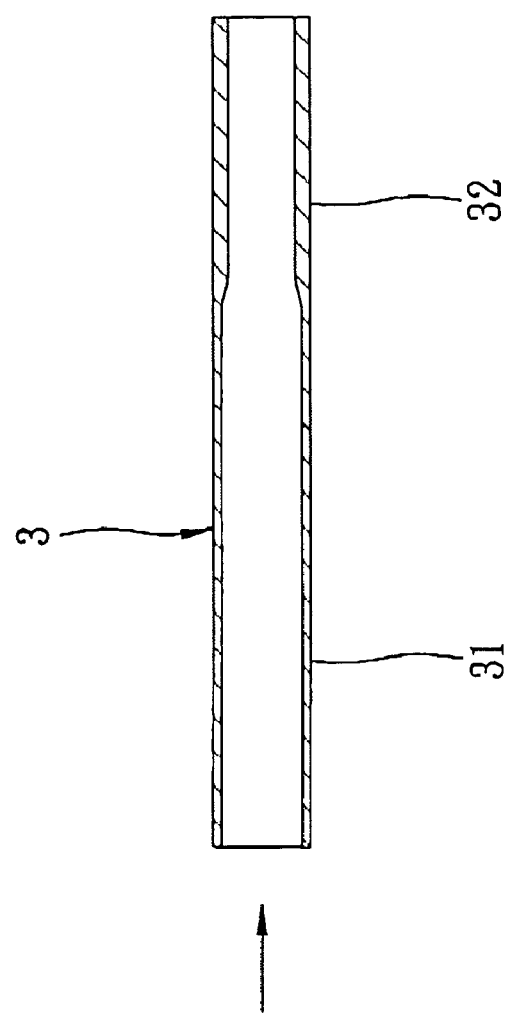
FIG. 4 is a schematic cross-sectional view to illustrate how the aluminum alloy tube is drawn to form a thin section and a thick end section in the preferred embodiment of the present invention.
Figure 5:
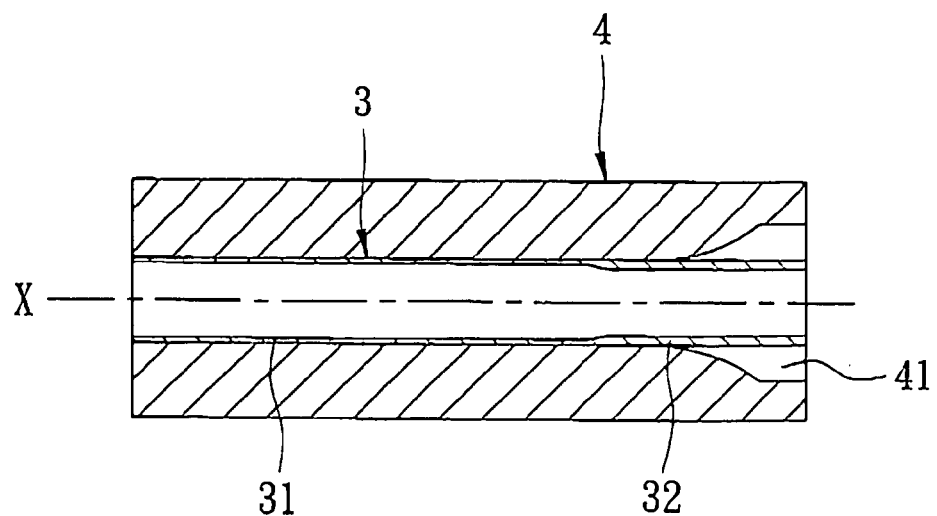
FIG. 5 is a schematic cross-sectional view to illustrate how the aluminum alloy tube is inserted into a first die in the preferred embodiment of the present invention.
Figure 6:
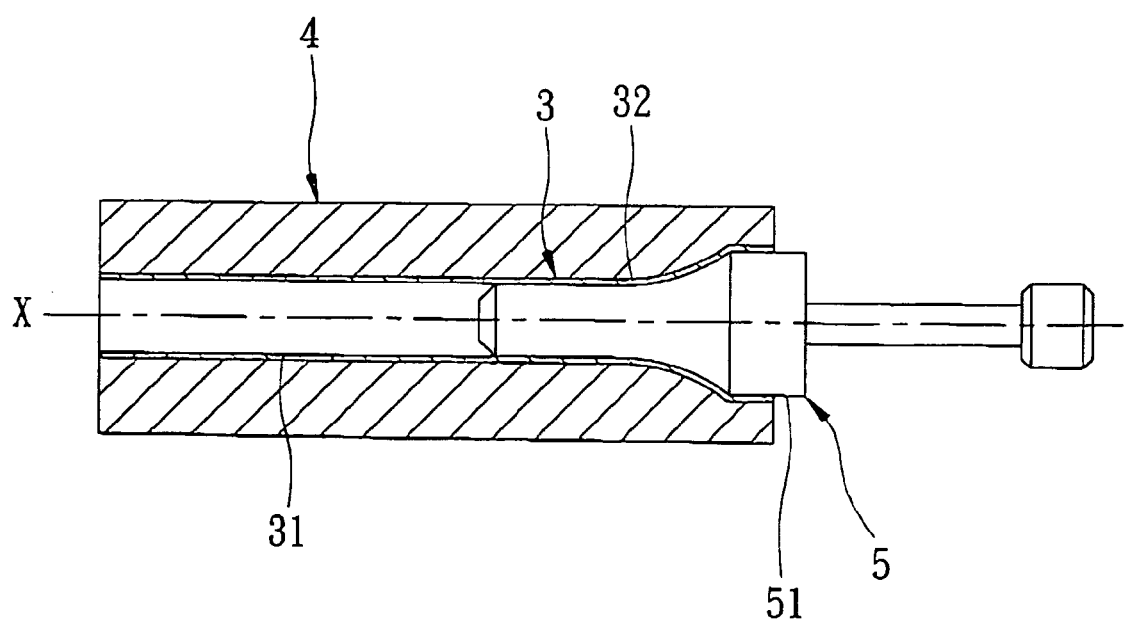
FIG. 6 is a schematic cross-sectional view to illustrate how the aluminum alloy tube is forged through a first mandrel in the preferred embodiment of the present invention.
Figure 7:
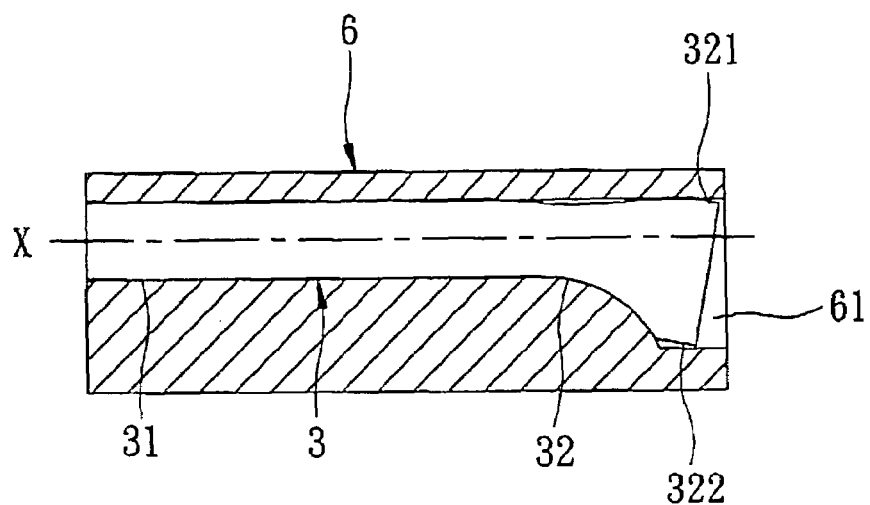
FIG. 7 is a schematic cross-sectional view to illustrate how the aluminum alloy tube of FIG. 6 is inserted into a second die.
Figure 8:
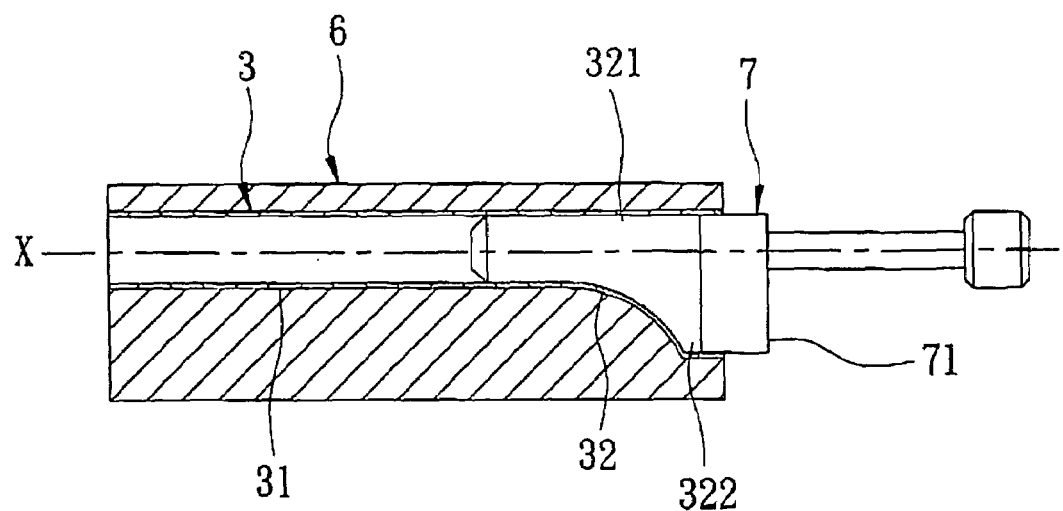
FIG. 8 is a schematic cross-sectional view to illustrate how the aluminum alloy tube of FIG. 7 is subjected to a second forging operation through a second mandrel.
Figure 9:
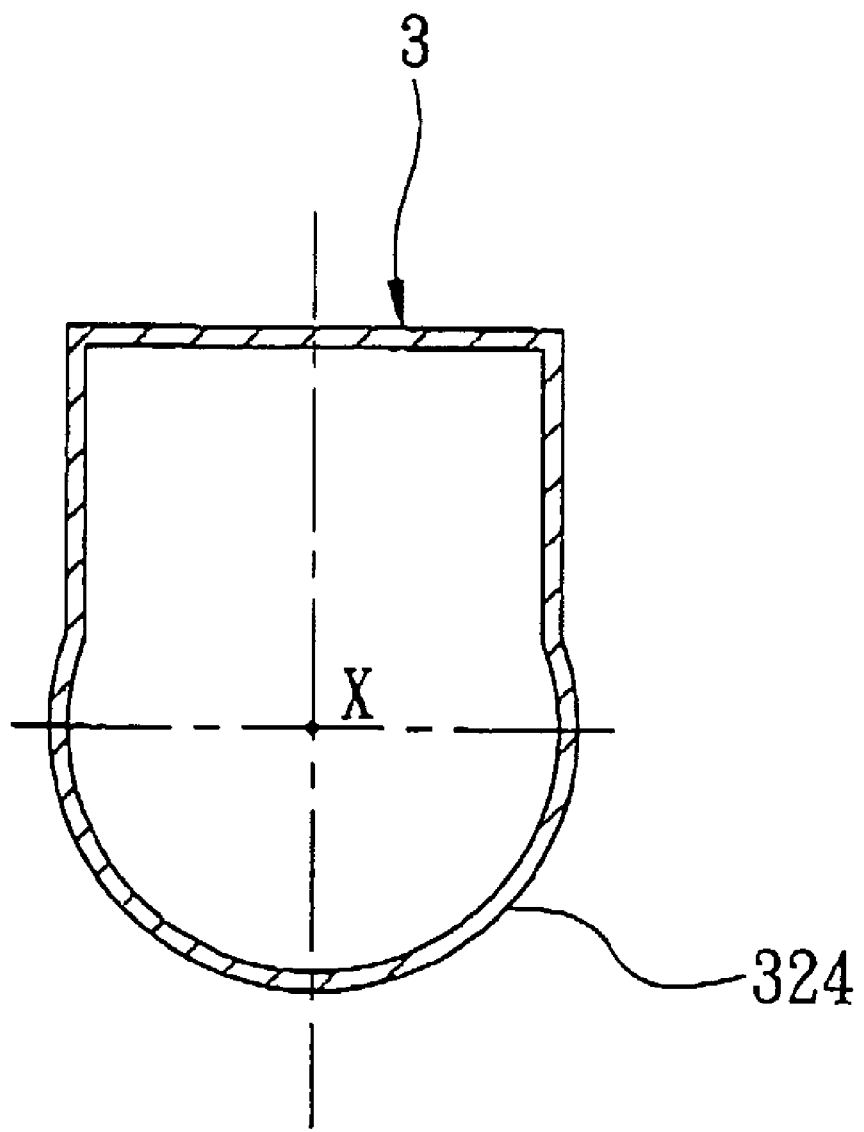
FIG. 9 is a cross-sectional view of the thick end section of the aluminum alloy tube resulting form the forging operation shown in FIG. 8.

FIGS. 3 to 9 illustrate consecutive steps of a preferred embodiment of a multi-stage forging method of this invention for disproportionally enlarging an end section of an aluminum alloy tube 3 of a bicycle frame part (see FIG. 9). The method includes the steps of: (a) preparing the aluminum alloy tube 3 having a predetermined length, first and second dies 4, 6 with end sections that respectively define first and second shape-forming cavities 41, 61, and first and second mandrels 5, 7 with shape-forming ends 51, 71 that have cross-sections respectively corresponding to those of the end sections of the first and second dies 4, 6 (see FIGS. 6 and 8); (b) drawing the aluminum alloy tube 3 to form a thin section 31 and a thick end section 32 extending from the thin section 31, wherein the thin section 3 has a wall thickness thinner than that of the thick end section 32 (see FIG. 4); (c) inserting the thin section 31 of the aluminum alloy tube 3 into the first shape-forming cavity 41 in the first die 4, as illustrated in FIG. 5; (d) radially and proportionally enlarging the cross-section of the thick end section 32 of the aluminum alloy tube 3 relative to a centerline (X) of the aluminum alloy tube 3 by forging the aluminum alloy tube 3 in the first shape-forming cavity 41 with the shape-forming end 51 of the first mandrel 5 inserted into the thick end section 32 of the aluminum alloy tube 3 in such a manner that the wall thickness of the thick end section 32 after being enlarged is substantially the same as that of the thin section 31, as best illustrated in FIG. 6; and (e) disproportionally varying the cross-section of the thick end section 32 of the aluminum alloy tube 3 by forging the aluminum alloy tube 3 obtained in step (d) in the second shape-forming cavity 61 with the shape-forming end 71 of the second mandrel 7 inserted into the thick end section 32 of the aluminum alloy tube 3, as illustrated in FIGS. 7 to 9. The thick end section 32 of the aluminum alloy tube 3 is forged in step (e) in such a manner that a portion 321 of the cross-section of the thick end section 32 of the aluminum alloy tube 3 is reduced and the remaining portion 322 of the cross-section of the thick end section 32 of the aluminum alloy tube 3 is further enlarged (see FIG. 7), and that the perimeter of an end edge 324 of the end section 32 of the aluminum alloy tube 3 obtained after step (e) (see FIG. 9) is substantially equal to that of the end edge 324 of the thick end section 32 of the aluminum alloy tube 3 obtained after step (d) and before step (e).

Figure 10:
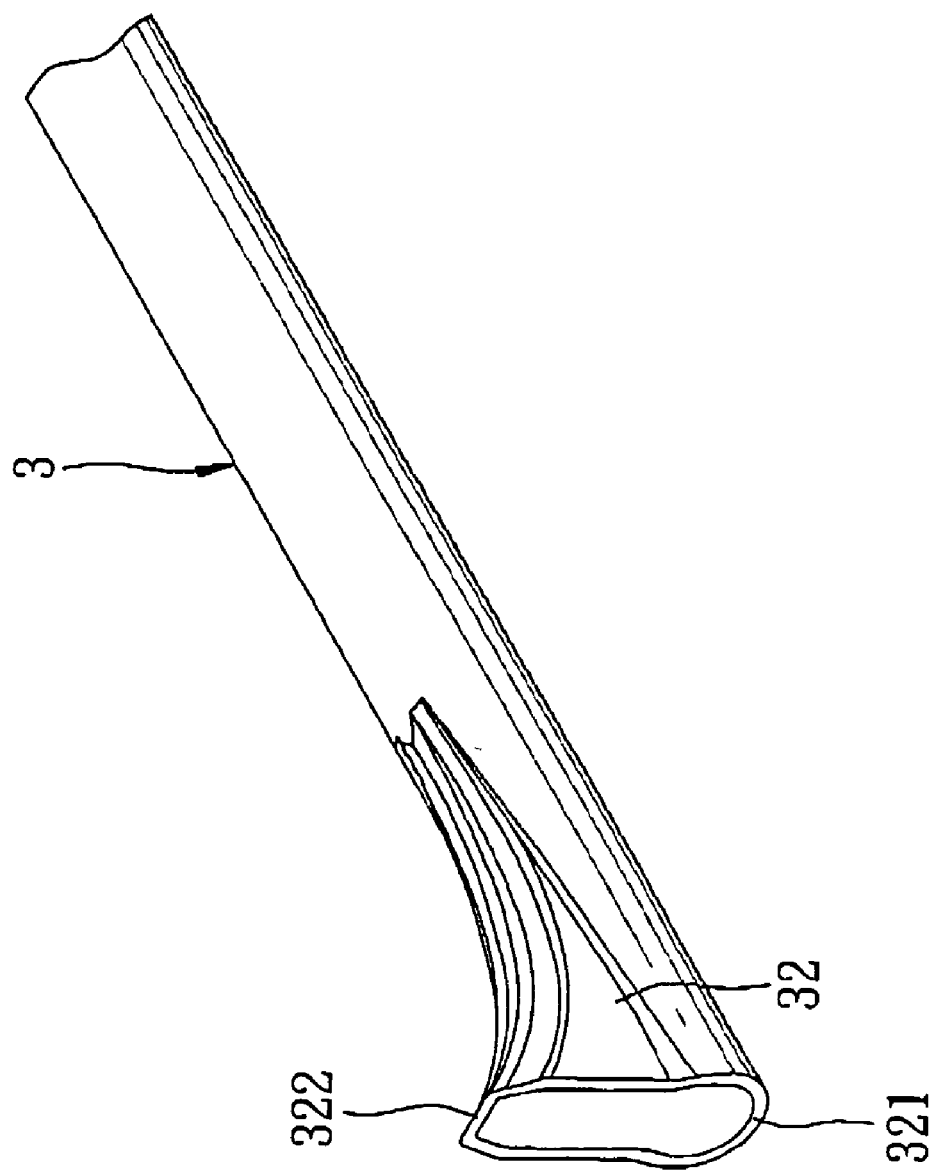
FIGS. 10 and 11 are perspective views to illustrate various shapes of the thick end section of the aluminum alloy tube that can be formed according to the method of this invention.
Figure 11:
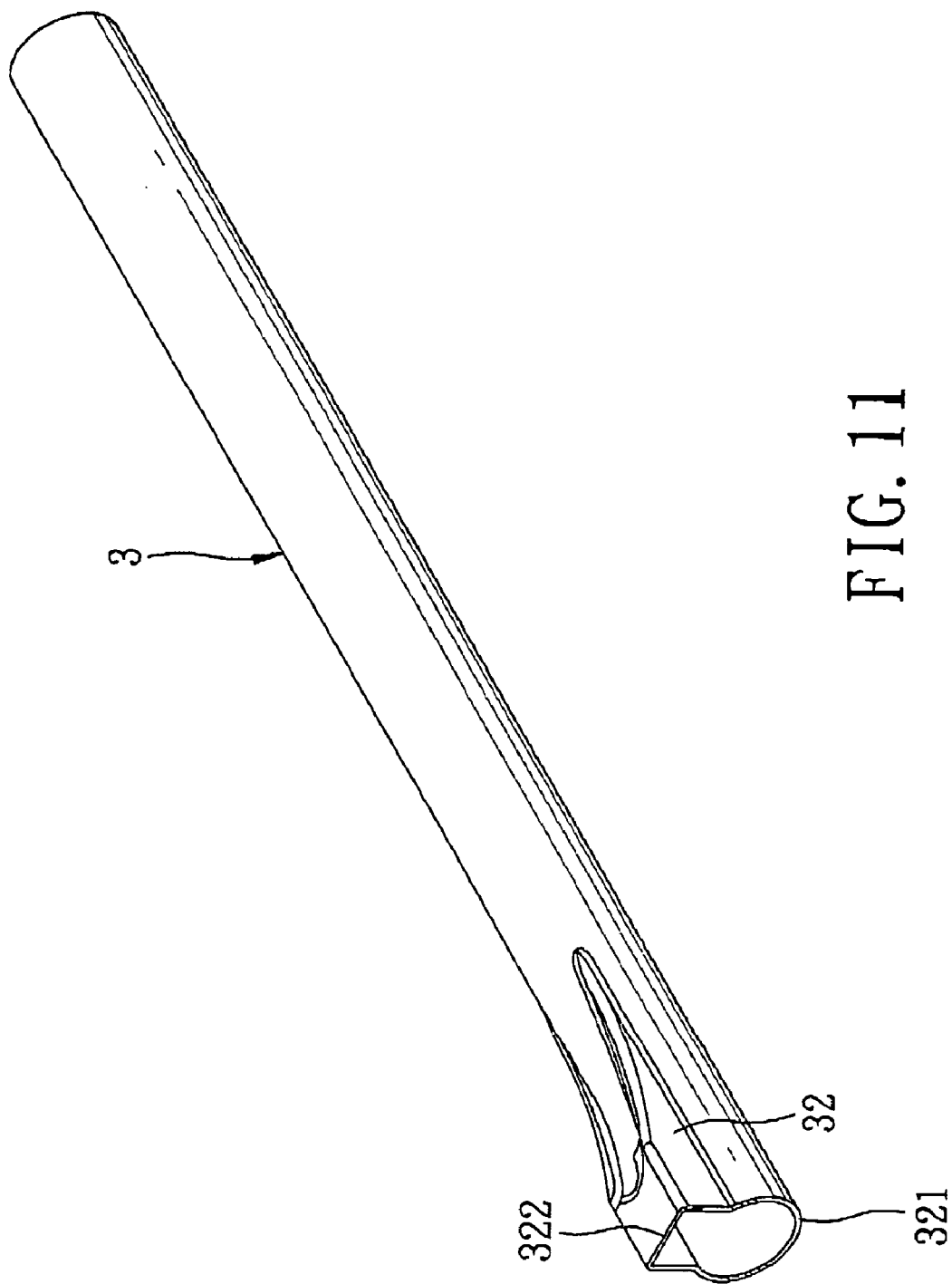

FIGS. 10 and 11 respectively illustrate various shapes of the thick end section 32 of the aluminum alloy tube 3 of a bicycle frame part that can be formed according to the method of this invention.

Preferably, in this embodiment, the aluminum alloy tube 3 is cleaned and subsequently immersed in a lubricant medium before the drawing operation of step (b).

In addition, if the aluminum alloy tube 3 is hardened before the drawing operation, the aluminum alloy tube 3 may be partially annealed prior to the drawing operation of step (b). More preferably, the partial annealing operation is conducted at a temperature ranging from 350° C. to 380° C. for 2 to 3 hours. Most preferably, the partial annealing operation is conducted at a temperature of 355° C. for 2.5 hours.

Preferably, in this embodiment, the aluminum alloy tube 3 is completely annealed prior to the insertion of the aluminum alloy tube 3 into the first die 4 in step (c). More preferably, the complete annealing operation is conducted at a temperature ranging from 400° C. to 420° C. for 2 to 3 hours. Most preferably, the complete annealing operation is conducted at a temperature of 410° C. for 2.5 hours. Additionally, before the complete annealing operation, the aluminum alloy tube 3 is cleaned by using a detergent to remove the lubricant coated on the aluminum alloy tube 3.

By virtue of the drawing operation and the complete annealing operation before conduction of the enlarging operation, the aforesaid drawbacks as encountered in the prior art can be eliminated. In addition, the thick end section 32 of the aluminum alloy tube 3, which is disproportionally enlarged according to the method of this invention, possesses a surface texture with regularly and gradually developed wrinkles that enhance the appearance of the aluminum alloy tube 3.

With the invention thus explained, it is apparent that various modifications and variations can be made without departing from the spirit of the present invention. It is therefore intended that the invention be limited only as recited in the appended claims.

I claim:

1. A multi-stage tube forging method for disproportionally enlarging an end section of an aluminum alloy tube of a bicycle frame part, comprising the steps of:
   (a) drawing the aluminum alloy tube to form a thin section and a thick end section extending from the thin section, wherein the thin section has a wall thickness thinner than that of the thick end section;
   (b) radially and proportionally enlarging the cross-section of the thick end section of the aluminum alloy tube by forging the aluminum alloy tube in a first die using a first mandrel in such a manner that the wall thickness of the thick end section after being enlarged is substantially the same as that of the thin section; and
   (c) disproportionally varying the cross-section of the thick end section of the aluminum alloy tube by forging the aluminum alloy tube obtained in step (b) in a second die using a second mandrel.

2. The multi-stage tube forging method of claim 1, wherein the perimeter of an end edge of the thick end section of the aluminum alloy tube obtained after step (c) is substantially equal to that of the end edge of the thick end section of the aluminum alloy tube obtained after step (b) and before step (c).

3. The multi-stage tube forging method of claim 1, wherein the aluminum alloy tube is cleaned and subsequently immersed in a lubricant medium before the drawing operation.

4. The multi-stage tube forging method of claim 1, wherein the aluminum alloy tube is partially annealed prior to the drawing operation.

5. The multi-stage tube forging method of claim 4, wherein the partial annealing operation is conducted at a temperature ranging from 350° C. to 380° C. for 2 to 3 hours.

6. A multi-stage tube forging method for disproportionally enlarging an end section of an aluminum alloy tube of a bicycle frame part, comprising:
   (a) drawing the aluminum alloy tube to form a thin section and a thick end section extending from the thin section, wherein the thin section has a wall thickness thinner than that of the thick end section;
   (b) radially and proportionally enlarging the cross-section of the thick end section of the aluminum alloy tube by forging the aluminum alloy tube in a first die using a first mandrel;
   (c) disproportionally varying the cross-section of the thick end section of the aluminum alloy tube by forging the aluminum alloy tube obtained in step (b) in a second die using a second mandrel: and
   wherein the aluminum alloy tube is completely annealed prior to the enlarging operation of step (b).

7. The multi-stage tube forging method of claim 6, wherein the complete annealing operation is conducted at a temperature ranging from 400° C. to 420° C. for 2 to 3 hours.

8. The method of claim 1, wherein the step of radially and proportionally enlarging the cross-section of the thick end section of the aluminum alloy tube includes forging the thickness of the thick end section to be substantially the same as the thickness of the thin section.

9. A method for making a tube for a frame part comprising:
   drawing a tube having a first section with a thickness and a second section; and
   radially and proportionally heat forging the second section of the tube from a first shape, which has a thickness that is greater than the thickness of the first section, to a second shape, which has a thickness that is less than the thickness of the first shape.

10. The method of claim 9, wherein the step of drawing includes shaping an aluminum alloy material.

11. The method of claim 9, wherein the step of drawing a tube includes partial annealing of the tube.

12. The method of claim 9, wherein the step of drawing a tube includes complete annealing of the tube.

13. The method of claim 9, wherein the step of radially and proportionally forging includes shaping the thickness of the thick end section to be substantially the same as the thickness of the thin section.

14. The method of claim 9, wherein the step of radially and proportionally forging includes shaping the second section of the tube about a die using a mandrel.

15. The method of claim 9, further comprising forging the second shape of the second section of the tube to a third shape, which has a first end portion that is disproportionally varied relative to a second end portion.

16. The method of claim 15, wherein the step of forging the second shape of the second section of the tube to a third shape includes heat forging the first end portion into a substantially rectangular shape and heat forging the second end portion into a substantially circular shape.

17. The method of claim 15, wherein the step of forging the second section of the tube includes heat shaping the second section about a die using a mandrel.

18. The method of claim 9, further comprising forming a surface texture having at least one wrinkle on the second section of the tube.

* * * * *